Patented Nov. 23, 1948

2,454,743

UNITED STATES PATENT OFFICE 2,454,743

COPOLYMER OF A CONJUGATED HYDROCARBON DIENE AND AN ACRYLATE OF A CYCLOPENTADIENYL ALCOHOL

David T. Mowry and Alfred B. Craig, Dayton, Ohio, assignors to Monsanto Chemical Company, St. Louis, Mo., a corporation of Delaware No Drawing. Application December 4, 1947, Serial No. 789,772

5 Claims. (Cl. 260—84.5)

This invention relates to new synthetic rubber compositions having desirable physical properties as are hereinafter described. More particularly this invention relates to a novel class of copolymers made by the poylmerization of hydrocarbon dienes and acrylic esters of alcohols prepared from cyclopentadiene.

Synthetic rubber made by the copolymerization of dienes, particularly butadiene and isoprene, and alkyl acrylates are well known. It is also known that of the many copolymers of butadiene and acrylic esters, those prepared from the esters of low molecular weight alkyl alcohols and acrylic acids possess better properties than do those of high molecular weight alcohols. The fundamental purpose of this invention is to provide new synthetic rubber made from higher molecular weight alcohol esters which have unusual tensile strength and resiliency, and which have better physical properties than commercial synthetic rubber of the GR-S type.

In accordance with this invention it has been found that hydrocarbon dienes, particularly those having the structure:

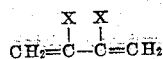

wherein X is either hydrogen or methyl, including butadiene, isoprene and 2.3-dimethyl butadiene, may be copolymerized with acrylic esters of alcohols prepared from cyclopentadiene to form excellent synthetic rubbers, possessing all the desirable properties for rubber compositions and without the inherently disadvantageous aspect of many commercial synthetic rubbers. In the preparation of the new copolymers from 40 to 90 percent of the hydrocarbon dienes are copolymerized with 10 to 60 percent of an ester of either acrylic acid or methacrylic acid and a cyclopentadienyl alcohol.

The acrylic esters used in the practice of this invention are derived from cyclopentadiene which polymerizes spontaneously to form a dimer having the structural formula:

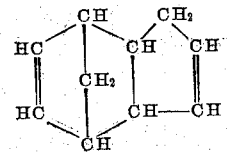

which may be readily converted to hydroxy-dihydro-exo-dicyclopentadiene by hydrolysis, for example by refluxing with sulfuric acid.

Another useful alcohol suitable for the preparation of acrylic esters capable of use in the practice of this invention can by synthesized by the hydrogenation of the unsaturated alcohol described in the preceding paragraph. This other useful alcohol is hydroxy-tetrahydro-exo-dicyclopentadiene and has the following structural formula:

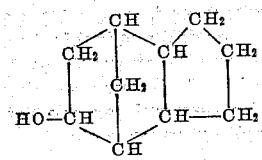

The esters are prepared by reacting the above described alcohols with acrylic or methacrylic acid utilizing conventional esterification procedures, preferably in the presence of a suitable esterification catalyst, such as benzene sulfonic acid or sulfuric acid, and a polymerization inhibitor to prevent the polymerization of the unsaturated acid or its esters during the esterification.

In the reparation of the synthetic rubber the desired proportions of monomer are mixed and charged to a suitable polymerization vessel with a substantial quantity of water. The polymerization is effected in an aqueous emulsion in the presence of an oxygen yielding catalyst, such as sodium perborate, hydrogen peroxide, sodium persulfate or other water soluble peroxy compounds or salts of peroxy acids having in their molecular structure the peroxy group (—O—O—), from 0.005 to 1.0 percent being used. The aqueous emulsions are usually stabilized by the presence of a small amount, for example from 1 to 5 percent by weight of a substance having both hydrophobic and hydrophilic radicals, such as rosin soap, sulfonated hydrocarbons, sodium aryl sulfates or analogous salts, triethanol amine or other amino soaps, the water soluble salts of high molecular weight fatty acids and mixtures thereof obtained by the saponification of animal and vegetable fats, and other similar compounds which induce or preserve the polymerization system in an emulsifying state.

The polymerizations are conducted by charging the mixed monomer, ester, catalyst and emulsifying agent into a suitable reactor which is provided with a means for maintaining the reactants in a suspension. The agitation may be effected by tumbling the reactor, by stirring with a suitable rotary mechanism, or by any other means which promotes an intimate contact between monomer and the various reagents charged to the vessel. The reaction vessel and its contents are maintained at a temperature above the normal room temperature, preferably between 30° C. and 80° C., for the purpose of inducing a rapid polymerization. Since the polymerization reaction evolves heat, care should be taken to avoid excessive temperatures and reaction rates, such that the heat of polymerization cannot be removed from the reaction vessel. In general the desired temperature is the highest temperature which will enable a uniform reaction throughout the polymerization period.

When the polymerization has proceeded to the desired extent the emulsion is precipitated by the addition of water soluble salts, acids, alcohols, or any other substance which destroys the effectiveness of the emulsifying agent. Thereafter the solid rubber may readily be separated from the aqueous liquor by filtration. The granular rubber so obtained may be milled directly in any suitable mixing equipment, but may alternatively be pressed into blocks for storage or further processing. The new rubber is compounded with the usual vulcanizing agents, for example antioxidants, accelerators, pigments, and curing agents with conventional machinery, for example on roll mills or in Banbury mixers.

The new copolymer is a good general purpose rubber but is especially suitable in applications requiring high tensile strength and elongation.

Further details of the preparation and compounding of the new rubber are set forth with respect to the following example.

Example

A 75 gram sample of the esters of methacrylic acid and hydroxy-tetrahydro-exo-dicyclopentadiene was charged to a steel bomb having a capacity of 1.6 liters with the following other materials:

| | |
|---|---|
| Butadiene _____grams__ | 225 |
| Distilled water_____cc__ | 750 |
| Soap (principally sodium stearate)__grams__ | 15 |
| Potassium persulfate_____do____ | 0.9 |
| Dodecyl mercaptan_____do____ | 1.5 |

Similar bombs were charged with identical compositions except that 75 grams of styrene and 75 grams of phenyl methacrylate respectively were used in place of the dicyclopentadiene derivatives. All of the bombs were provided with pressure gauges for following the course of the reaction. After heating the bombs to the reaction temperature of 50° C. pressures of approximately 50 pounds per square inch were observed. The polymerizations were conducted by maintaining the temperature at 50° C. by tumbling the bombs in a circulating hot air oven. After the interior pressure of the bombs dropped below 25 pounds per square inch the reaction masses were cooled and 0.3 grams of hydroquinone was added to each latex.

Antioxidant emulsions were prepared by dissolving 4.5 grams of a reaction product of acetone and p-aminobiphenyl in 25 ml. of benzene. These mixtures were then added with stirring to solutions of 0.75 grams of soap and 75 cc. of water. One of the emulsions so prepared was added to each of the latices prepared in accordance to the above description. Each of the latices was coagulated by adding an equal portion of a solution of 189 grams of sodium chloride, 1.64 grams of aluminum sulfate in a mixture of 1330 ml. of distilled water, 1.64 ml. of glacial acetic acid and 300 ml. of isopropyl alcohol. The precipitates resulting from the coagulations were separated by filtration, washed with distilled water, and dried in a circulating hot air oven. Each of the copolymers was compounded on a cold laboratory roll mill in accordance with the following formulation:

| | Parts by weight |
|---|---|
| Copolymer _____ | 100.0 |
| Black (Kosmobile 77) _____ | 40.0 |
| Zinc oxide _____ | 3.0 |
| Stearic acid_____ | 1.0 |
| Reaction product of acetone and p-aminobiphenyl _____ | 1.0 |
| Sulfur _____ | 2.0 |
| N-cyclohexyl-2-benzothiazyl sulfenamide__ | 1.2 |

After thorough mixing the compositions were sheeted and cut into standard test samples which were cured by heating at 142° C. for 60 and 90 minute periods. Some of the samples were aged by heating at 100° C. for 48 hours. The following table shows the test results.

| | Minutes Cure | Unaged —25° C. | | Aged 48 hrs— 100° C. | |
|---|---|---|---|---|---|
| | | Tensile | Elongation | Tensile | Elongation |
| New Rubber | 60 | 2,906 | 430 | 2,765 | 285 |
| | 90 | 2,906 | 400 | | |
| GR-S | 60 | 2,366 | 440 | 1,826 | 220 |
| | 90 | 2,544 | 430 | | |
| Phenyl-methacrylate | 60 | 1,320 | 625 | 1,605 | 495 |
| | 90 | 1,200 | 600 | 1,535 | 490 |

The above table demonstrates the superiority of the new synthetic rubber to commercial synthetic rubber and to one of the butadiene-methacrylic ester rubbers known to the prior art.

Although the invention has been described with respect to specific examples, it is not intended that the scope shall be limited by the details thereof, except to the extent incorporated in the following claims.

We claim:
1. A synthetic rubber which comprises a copolymer of 40 to 90 percent of a conjugated hydrocarbon diene having the structural formula:

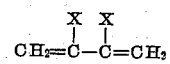

wherein X is a radical of the group consisting of hydrogen or methyl and from 10 to 60 percent of a dicyclopentadienyl alcohol ester of an acid of the group consisting of acrylic acid and methacrylic acid.

2. A synthetic rubber which comprises a copolymer of 40 to 90 percent of butadiene and from 10 to 60 percent of an ester having the structural formula:

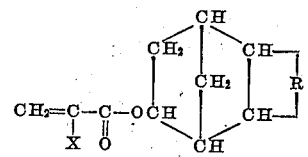

wherein R is a divalent radical of the group consisting of trimethylene and 1,3-propenylene, and X is a radical of the group consisting of hydrogen and methyl.

3. A synthetic rubber which comprises a copolymer of 40 to 90 percent of butadiene and from 10 to 60 percent of an ester having the following structural formula:

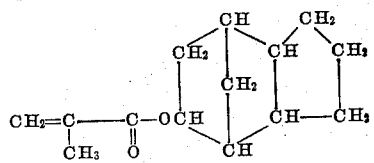

4. A synthetic rubber which comprises a copolymer of 40 to 90 percent of butadiene and from 10 to 60 percent of an ester of methacrylic acid and hydroxy-dihydro-exo-dicyclopentadiene.

5. A synthetic rubber which comprises a copolymer of 40 to 90 percent of butadiene and from 10 to 60 percent of an ester having the structural formula:

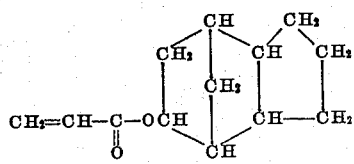

DAVID T. MOWRY.
ALFRED B. CRAIG.

No references cited.